United States Patent [19]

Ojima et al.

[11] 4,404,643
[45] Sep. 13, 1983

[54] PORTABLE ELECTRONIC CALCULATOR WITH A WRITING INSTRUMENT

[75] Inventors: Shin Ojima; Kazutaka Watanabe; Hiroshi Iwasaki, all of Yao, Japan

[73] Assignee: Hosiden Electronics Co., Osaka, Japan

[21] Appl. No.: 233,716

[22] Filed: Feb. 12, 1981

[30] Foreign Application Priority Data

Feb. 27, 1980 [JP] Japan .............................. 55-24761[U]

[51] Int. Cl.³ .............................................. G06F 3/02
[52] U.S. Cl. .................................... 364/705; 364/705; 364/708; 401/105
[58] Field of Search ............................... 364/705-710; 51/268; 401/105; 206/537; 200/50 A; 368/248, 312; 73/431

[56] References Cited

U.S. PATENT DOCUMENTS 3,622,720 11/1971 Allen .............................. 200/50 A
4,128,889 12/1978 Ojima et al. ...................... 364/705

*Primary Examiner*—Felix D. Gruber
*Assistant Examiner*—Tim A. Wiens
*Attorney, Agent, or Firm*—Pollock, Vande Sande & Priddy

[57] ABSTRACT

A portable electronic calculator which has incorporated therein a writing instrument. A miniature electronic calculator is built in a rectangular, elongated body. A cover made of metal covers a control panel for the electronic calculator and a display part, and the cover is mounted on the body to be removable therefrom by sliding the cover in the lengthwise direction of the body. The side marginal portions of the cover are bent inwardly for engagement with both side surfaces of the body to reinforce the body when the cover has been mounted thereon.

10 Claims, 9 Drawing Figures

PORTABLE ELECTRONIC CALCULATOR WITH A WRITING INSTRUMENT

BACKGROUND OF THE INVENTION

The present invention relates to a portable electronic calculator having incorporated therein a writing instrument such as, for example, a ball-point pen, that is, a calculator which can be used both as a writing instrument and as a portable electronic calculator.

Recently, thin, card-type portable electronic calculators have been placed on the market. These calculators are handy to carry but mechanically weak because of their small thicknesses. A portable electronic calculator of the type having a writing instrument is very convenient since it is possible to write down the result of a calculation without using another writing instrument, or to conduct further calculations immediately after writing down the result of a previous calculation; namely, there is no need of carrying a calculator and a writing instrument separately.

In view of the above, there have been proposed portable electronic calculators in U.S. Pat. Nos. 4,029,915 issued June 14, 1977 and 4,128,889 issued Dec. 5, 1978. In the calculator of the former patent, keys are arranged in a row but four inputs are selectively entered by one key, so that it is likely to erroneously operate the keys. The calculator of the latter patent is almost free from the erroneous key operation in that one input is entered by one key, but since the keys are arranged in three rows on a cylindrical body, the keyboard is not flat but forms a part of the cylindrical surface of the body and, consequently the keys are somewhat difficult to operate. In either case, since the keys are exposed on the surface of the body, they act as a hindrance when the calculator is inserted into or taken out of a pocket. Further, since a ball-point pen is housed at the center of the cylindrical body, if the length of the body is limited, the ball-point pen must be reduced in length because of relative arrangements of various parts.

A writing instrument is generally made long and slender so that it easy to use, and a portable electronic calculator having a flat control panel is easy to operate. Accordingly, it is advantageous to combine a calculator of a rectangular, elongated configuration with a writing instrument. In this case, however, if the calculator body is made too thin, it is readily broken and, even if not broken, it is bent and difficult to use as the writing instrument.

It is an object of the present invention to provide a portable electronic calculator with a writing instrument which has a thin, elongated configuration and is neither broken nor deformed when the writing instrument is used and which allows ease in the use of the writing instrument and in the operation of the calculator.

Another object of the present invention is to provide a portable electronic calculator with a writing instrument which can easily be inserted into or taken out of a pocket.

Another object of the present invention is to provide a portable electronic calculator with a writing instrument which permits easy replacement of the writing instrument.

Yet another object of the present invention is to provide a portable electronic calculator which is easy to assemble.

SUMMARY OF THE INVENTION

According to the present invention, a miniaturized electronic calculator is incorporated in a thin, rectangular, elongated body and a cover of a metal is mounted on the body to cover a control panel of the electronic calculator and a display screen. The cover is designed to be removable from the body by sliding it in the lengthwise direction of the body. Both side marginal portions of the cover are bent inwardly to form engaging edges for engagement with guide grooves formed in both side surfaces of the body so that the cover and the body are slidable relative to each other. The metal cover itself reinforces the body but the engaging edges of the cover are bent to increase the mechanical strength of the cover and serve as guides for removing the cover from the body. The body comprises a thin, rectangular, elongated, molded plate of a synthetic resin and a reinforcement plate of a metal mounted on the back of the molded plate. Both side marginal portions of the reinforcement plate are bent inwardly to provide engaging edges, which are fitted into guide grooves formed in both side surfaces of the molded plate to secure the reinforcement plate and the molded plate to each other, thus reinforcing the molded plate. An integrated circuit element, a display part, a battery and a keyboard of the electronic calculator are respectively housed in corresponding housing parts formed in the molded plate and a panel is mounted on the molded plate to cover and hold the abovesaid components in the molded plate.

A ball-point pen, which is used as a writing instrument, is housed in the body in such a manner that the ball-point pen can freely be projected out from one end face of the body. A cylindrical holder is disposed in a ball-point pen housing part of the body in a manner to be movable in the lengthwise direction of the body and an inner end portion of the ball-point pen is inserted into the holder and fixed thereto by frictional coupling therebetween. An operating piece mounted on the holder projects out of the body from one side thereof and, by operating the projecting piece, the ball-point pen can be projected out of the body and drawn back thereinto. The ball-point pen can easily be replaced by pulling out the ball-point pen at its projected position and inserting a new ball-point pen into the holder. The holder is biased by a spring in a direction in which the ball-point pen is drawn back into the body. The operating piece is operated against the biasing force to project out and the operating piece is turned into engagement with the body.

DESCRIPTION OF THE PREFERRED EMBODIMENT

Figure 1:
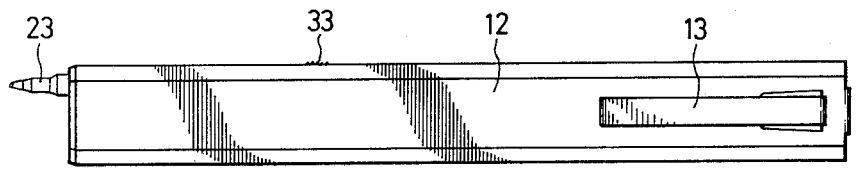
FIG. 1 is a plan view showing an embodiment of the portable electronic calculator with a writing instrument according to the present invention, with a ball-point pen projecting out.
Figure 2:
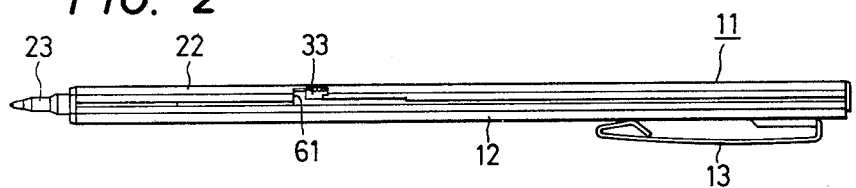
FIG. 2 is a side view of FIG. 1.

FIGS. 1 and 2 are exterior views showing an embodiment of the portable electronic calculator with a writing instrument according to the present invention, in which a metal cover 12 is mounted on a rectangular, elongated body 11 in a manner to be slidable thereon in its lengthwise direction for removal therefrom. The cover 12 has a clip 13 attached thereto at one end. In FIGS. 1 and 2 a ball-point pen 23, which is used as the writing instrument in this example, is shown to be projected out from the body 11.

Figure 3:
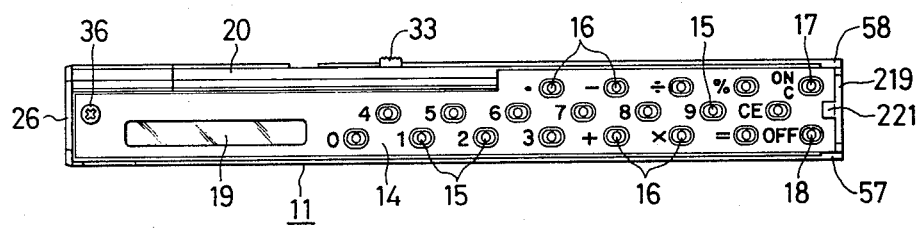
FIG. 3 is a plan view of the portable electronic calculator of FIG. 1, with its cover taken off and with the ball-point pen drawn back into the calculator body.

FIG. 3 is a plan view showing the portable electronic calculator, with the cover 12 taken off. Reference numeral 14 indicates generally a control panel of the portable electronic calculator, which panel is formed on one surface of the body 11. A function part in which numeral keys 15, function keys 16 for division, multiplication and so forth, a key 17 for turning ON a power source and a key 18 for turning OFF the power source are arranged in three rows is disposed on one part of the control panel 14 in its lengthwise direction and a display part 19 for displaying an inputted number and a calculation result is disposed on the other part of the control panel 14.

Figure 4:
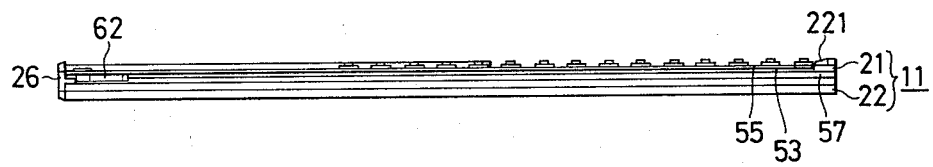
FIG. 4 is a side view of FIG. 3.
Figure 5:
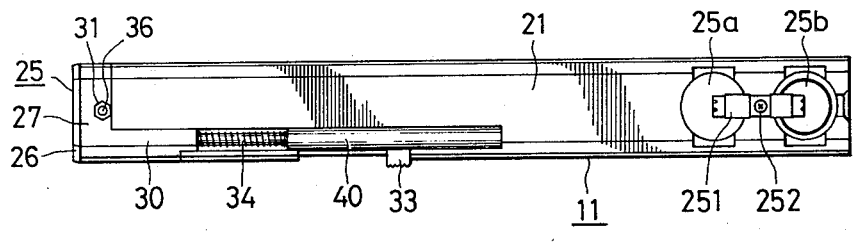
FIG. 5 is a bottom view of the portable electronic calculator of FIG. 3, with a reinforcement plate 22 removed.
Figure 6:
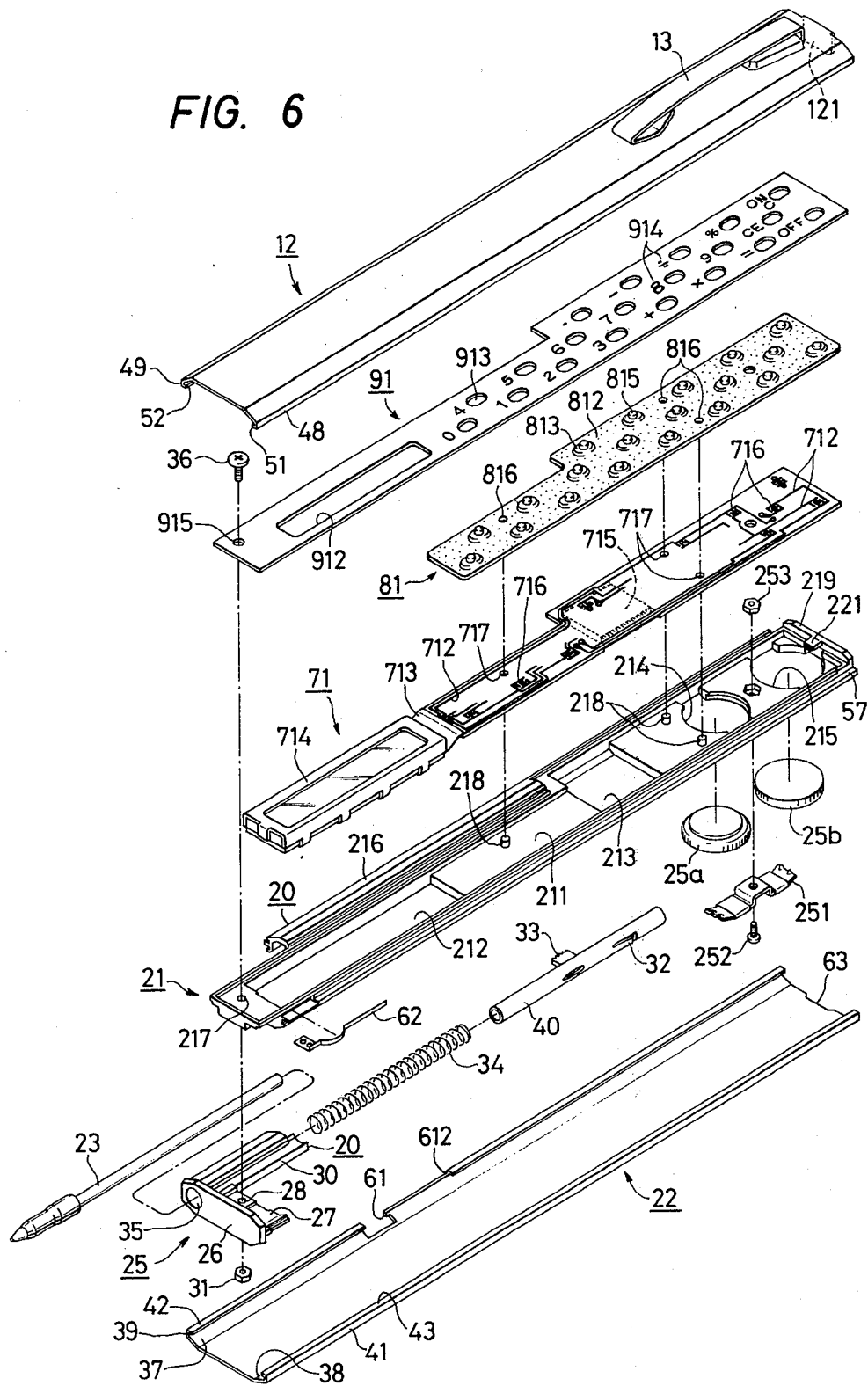
FIG. 6 is an exploded perspective view of the portable electronic calculator of the present invention.

In this embodiment the body 11 comprises a rectangular, elongated plate 21 made by molding of a synthetic resinous material and a reinforcement plate 22 which covers the back of the molded plate 21 on the opposite side from the control panel 14, as illustrated in FIGS. 4 and 6. The reinforcement plate 22 is made of metal and has substantially the same configuration as the cover 12. The body 11 has incorporated therein the ball-point pen 23, as referred to previously, and a ball-point pen housing part 20 is provided in the body 11 to extend in its lengthwise direction in side-by-side relation to the display part 19.

The molded plate 21 of the body 11 has formed therein a shallow recess 211 over substantially the entire area of its surface on the side of the cover 12. In the recess 211 there are formed a display element housing part 212 at the position of the display part 19, an LSI element housing part 213 at the center of the recess 211 and battery housing holes 214 and 215 in the end portion of the molded plate 21 on the opposite side from the housing part 212. The battery housing holes 214 and 215 have housed therein batteries 25a and 25b, which are respectively held in position by both ends of a contact piece 251 made of metal which is clamped by a screw 252 inserted into a centrally disposed hole of the contact piece and a hole made in the plate 21 and a unit 253. The ball-point pen housing part 20 is formed in the molded plate 21 to extend along one side of the display element housing part 212 in its lengthwise direction. One end portion 25 of the molded plate 21 on the side of the ball-point pen housing part 20 is formed separately of the molded plate 21. The end portion 25 is composed of an end plate 26 through which the ball-point pen can be projected out and a coupling part 27 which is formed integrally with the bottom edge of the end plate 26 to extend on the back of the molded plate 21. The coupling part 27 has therein a nut receiving hole 28. A guide member 30 having a U-shaped cross-section extends from the end plate 26 and the coupling part 27 along one side of the molded plate 21 to form a part of the ball-point pen housing part 20. The free end of the guide member 30 is abutted against the end face of a semi-cylindrical member 216 of the molded plate 21 which forms a part of the ball-point pen housing part 20.

In the ball-point pen housing part 20 is disposed a movable holder 40 for receiving one end portion of a ball-point pen 23. The holder 40 is a cylindrical member made of a synthetic resinous material and movable in the lengthwise direction of the body 11. The holder 40 has a stopper at one end thereof for receiving the ball-point pen 23 and a press piece 32 formed integrally with the holder 40 in the vicinity of the stopper for pressing the peripheral surface of the end portion of the ball-point pen 23 inserted into the holder 40. The press piece 32 is, for example, tongue-shaped and formed by cutting a small part of the peripheral wall of the holder 40 and bending it to slightly protrude into the holder 40, preventing the inserted end portion of the ball-point pen 23 from slipping out of the holder 40. But the ball-point pen 23 can be drawn out from the holder 40 by pulling it firmly.

The holder 40 carries at the center thereof a projecting piece 33 which slightly projects out from one side of the body 11. By moving back and forth the projecting piece 33 in the lengthwise direction of the body 11, the ball-point pen 23 can be projected out from the body 11 and drawn back thereinto. In order that the ball-point pen 23 may automatically be drawn back into the body 11, a coiled spring 34 is wound on the ball-point pen 23 and disposed between the guide member 30 and the holder 40 to always bias the latter in a direction in which the ball-point pen 23 is drawn back into the body 11. The U-shaped guide member 30 is extended and a hole 35 is made in the end plate 26 in a manner to communicate with inside the U-shape of the guide member 30. The ball-point pen 23 can be projected out through the hole 35.

The end portion 25 and the molded plate 21 are assembled together by screwing a screw 36 into a nut 31 disposed in the nut receiving hole 28 of the coupling part 27 through a hole 217 made in the molded plate 21 in alignment with the hole 28 of the coupling plate 27 of the end portion 25.

Figure 7:
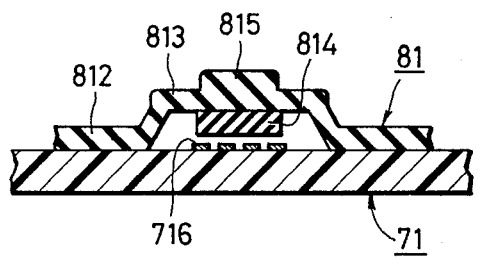
FIG. 7 is a cross-sectional view showing an example of a key used in the present invention.

As shown in FIG. 6, a printed circuit board 71 has formed thereon required conductors 712 and is connected at one end to a liquid crystal display element 714 via a flat cable 713. The underside of the printed circuit board 71 has mounted thereon an IC chip 715 of the electronic calculator. The display element 714 and the IC chip 715 are respectively disposed in the housing parts 212 and 213 of the molded plate 21 and the printed circuit board 71 is placed in the recess 211. A keyboard 81 is disposed on the printed circuit board 71. The keyboard 81 is formed, for example, by a rubber sheet 81 which has upward elliptic protrusions 813 formed integrally therewith by embossing at those positions respectively corresponding to the keys 15, 16, 17 and 18. As shown in FIG. 7, a conductive rubber element 814 is mounted on the inside of each protrusion 813. When the protrusion 813 is pressed towards the printed circuit board 71, a pair of conductors of a switching part 716 on the printed circuit board 71 are short-circuited via the conductive rubber element 814. Since the keys are disposed closely to adjacent ones of them, it is preferred to form a projection 815 integrally with the protrusion 813 on the top thereof so as to avoid an erroneous key operation.

In the recess 211 of the molded plate 21 positioning pins 218 are planted at a plurality of positions, which pins are formed integrally with the molded plate 21. These pins 218 receive positioning holes 717 made in the printed circuit board 71 and positioning holes 816 made in the rubber sheet 81. A panel 91 made of metal is disposed over the rubber sheet 81 and the display drive element 714. The panel 91 has formed therein a window 912 at the position corresponding to the screen of the display element 714 and holes 913 through which the protrusions 813 of the keys project out. In the vicinity of each hole 913 there is provided a symbol 914 indicating the content which is inputted by the key. One end of the panel 91 is retained by an engaging pawl 221 formed integrally with an end plate 219 of the molded plate 21 on the opposite side from the end plate 26 of the body 11 and the screw 36 is clamped to nut 31 through a hole 915 made in the other end of the panel 91. In this way, the panel 91 is fixed to the body 11. It is preferred that the interior surface of the panel 91 be attached, e.g., by an adhesive binder, to the peripheral portions of the rubber sheet 91 and the display element 714.

Figure 8:
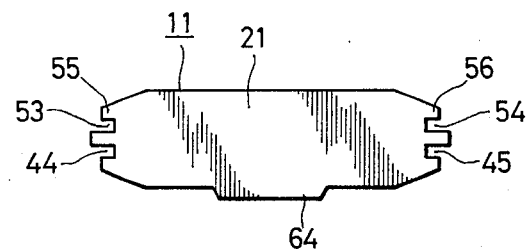
FIG. 8 is a schematic diagram showing one end face of a molded plate.

Both marginal portions of the reinforcement plate 22 are bent inwardly so that the reinforcement plate 22 may be mounted on the molded plate 21 in a manner to be slidable in its lengthwise direction. As depicted in FIG. 6, in this embodiment the opposing marginal portions of the reinforcement plate 22 are bent slightly inwardly to form tapered portions 37 and 38, the marginal portions of which are bent to provide side plates 39 and 41 facing the side surfaces of the molded plate 21 and, further, marginal portions of the side plates 39 and 41 are bent inwardly at right angles thereto to form engaging edges 42 and 43. The engaging edges 42 and 43 are respectively fitted into grooves 44 and 45 (see FIG. 8) formed in the side surfaces of the molded plate 21. The engaging edges 42 and 43 and the grooves 44 and 45 are formed along substantially the entire length of the molded plate 21.

Figure 9:
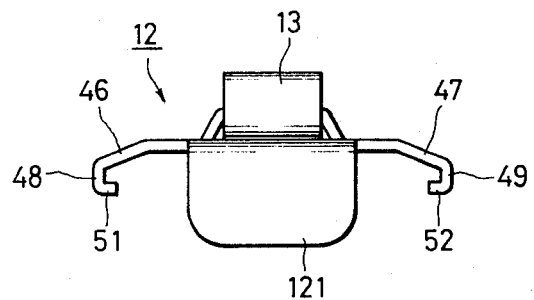
FIG. 9 is a schematic diagram showing one end face of the cover.

Similarly, both marginal portions of the cover 12 are also engaged with grooves formed in the side surfaces of the body 11 and consequently in the molded plate 21. As is the case with the reinforcement plate 22, the opposing marginal portions of the cover 12 are bent slightly inwardly towards the panel 14 to form tapered portions 46 and 47 (see FIG. 9), the marginal portions of which are bent to provide side plates 48 and 49 facing the opposite side surfaces of the body 11 and, further, marginal portions of the side plates 48 and 49 are bent inwardly to form engaging edges 51 and 52, as depicted in FIGS. 6 and 9. The engaging edges 51 and 52 are respectively fitted into guide grooves 53 and 54 cut in the opposing side surfaces of the body 11.

Flange-like projections 55 and 56, which are formed in the side surfaces of the molded plate 21 on the side of the panel as a result of the formation of the guide grooves 53 and 54, are cut off at one end on the opposite side from the side on which the ball-point pen 23 is projected out, providing guide surfaces 57 and 58 which are respectively contiguous to the side surfaces of the guide grooves 53 and 54 on the side of the reinforcement plate 22. Accordingly, the cover 12 can easily be assembled with the body 11 by sliding the cover 12 towards the side of the ball-point pen receiving hole 35 after resting the engaging edges 51 and 52 of the cover 12 at one end thereof on the guide surfaces 57 and 58, with the side plates 48 and 49 of the cover 12 holding one part of the body 11.

To permit movement of the operating piece 33, the ball-point pen housing part 20 of the molded plate 21 is partly removed and the engaging edge 42 of the reinforcement plate 22 is partly cut off. In order to prevent the ball-point pen 23 from being drawn back into the body 11 when the pen has been projected out therefrom, the reinforcement plate 22 has formed therein a notch 61 contiguous to a stepped portion 612 formed in the engaging edge 42; when the ball-point pen 23 has been projected out from the body 11, the operating piece 33 is turned into engagement with the notch 61. When the cover 12 is assembled with the body 11, the end portion of the cover 12 on the side of the ball-point pen 23 is stopped by the end plate 26 and a projecting piece 121 which extends downwardly from the edge of the cover 12 rearward of the clip 13 is abutted against an end plate 219 of the body 11.

Further, a plate spring 62, which is bent to project outwardly, is provided in the guide groove 53. When the cover 12 has been assembled with the body 11, the plate spring 62 resiliently receives a recess (not shown) formed in one end portion of the engaging edge 51 to inhibit removal of the cover 12 from the body 11. When the reinforcement plate 22 has been assembled with the molded plate 21, an engaging recess 63 formed in one end portion of the reinforcement plate 22 is engaged with a projection 64 formed in the body 11 and, by tightening the screw 36, the interior surface of the end plate 26 is abutted against the end face of the reinforcement plate 22, which is thus fixed at both ends in its lengthwise direction.

According to the portable electronic calculator of the present invention described in the foregoing, even though the body 11 is thin and elongated so that it is easy to use as a writing instrument, the body 11 is reinforced by the metal cover 12 and hence cannot be bent or broken. Since the body is rectangular and elongated, the control panel 14 is provided on a flat portion of the body to permit ease in the operation of the calculator. The marginal portions of the cover 12 are bent to form the engaging edges 51 and 52 and these edge portions are U-shaped in cross-section to provide for enhanced mechanical strength. In addition, the tapered portions 46 and 47 also serve to reinforce the cover 12. The guide surfaces 57 and 58 facilitate the assembling of the cover 12 with the body 11.

Since the cover 12 is used as described above, the operation part of the calculator does not provide any hindrance when the ball-point pen is used or the calculator is inserted into and taken out of a pocket. Further, when a push-button switch is used as a power source switch as in the above example, if the cover 12 is not used, then there is the possibility that the power source will be erroneously turned ON and wastefully dissipated but, in the present invention, the cover 12 eliminates such possibility. Moreover, with the use of the cover 12, the calculator presents a fine outside appearance. In the case where the body 11 has assembled therewith the reinforcement plate 22 as described previously, it is also possible to take notes while conducting calculations. This calculator is of rectangular, elongated configuration, for example, about 1.5 cm wide, about 12 cm long and 5 mm thick; accordingly, it can easily be used as a ball-point pen when the cover 12 is in place, and when it is to be used as a calculator the body 11 can easily be held in one hand while the cover 12 is removed by the other hand and the keys operated by said other hand. Further, the batteries 25a and 25b can easily be replaced by removing the reinforcement plate 22 and the screws 36 and 252.

The ball-point pen 23 can easily be replaced as follows: The ball-point pen 23, after being projected out of the body 11, is readily pulled out of the holder 40 and then the rear end portion of a new ball-point pen is inserted into the body 11 through the hole 35 and pressed into the holder 40. By the engagement of the spring 62 with the recess of the cover 12, the cover 12 can be prevented from coming off from the body 11, as described previously. From the viewpoints of light weight, durability and appearance, it is preferred to make the cover 12 of aluminum. In the case where such a cover is used, if a steel ball biased by a spring is combined with the recess of the cover 12 for preventing the cover from coming off from the body 11, then the recess of the cover 12 will be worn out in a relatively short time and cannot receive the steel ball. If a projection is formed in the molded plate 21 for the same purpose, then it will also worn out in a relatively short time. In the foregoing embodiment, however, the engagement of the spring 62 with the recess of the cover 12 is free from such a defect.

When one tries to put the electronic calculator into a pocket to be retained therein by the clip 13, he may happen to push with his finger only the body 11 while holding the cover 12 with the other fingers. Therefore, in such a case, if the projecting piece 121 were not provided in the cover 12, there would be a possibility that the body 11 may slide down a little from the cover 12 and, when he takes out the calculator from the pocket, he may find himself taking out only the cover 12, leaving the body 11 in the pocket. With the provision of the projecting piece 121, however, when the electronic calculator is inserted into the pocket and retained therein by the clip 13, the projecting piece 121 is pushed by a finger to ensure that the cover 12 does not slip out from the body 11, and when the calculator is taken out of the pocket, there is no fear of only the body 11 being left in the pocket. Since the body 11 has the rectangular, elongated configuration, the ball-point pen 23 can be housed along one side of the body 11 and a much longer ball-point pen can be housed than in the case of a cylindrical body of the type used in the aforementioned U.S. Pat. No. 4,128,889.

It will be apparent that many modifications and variations may be effected without departing from the scope of the novel concepts of this invention.

What is claimed is:

1. A portable electronic calculator with a writing instrument, comprising:
    a rectangular, elongated, thin body having a plurality of calculator element housing portions respectively aligned with one another in the lengthwise direction of said body, said body also having an elongated, narrow writing element housing part formed between one of the side edges of said body and at least one of said calculator element housing portions and extending in the lengthwise direction of said body along said one of said side edges of said body;
    a keyboard provided on one portion of a flat panel surface of said body for inputting numeric values and functions;
    semiconductor integrated circuit means housed in one of said calculator element housing portions and connected to said keyboard for conducting a calculation corresponding to the input from the keyboard;
    display means provided on another portion of said flat panel surface, said display means being housed in another one of said calculator element housing portions and connected to said semiconductor integrated circuit means for displaying the input numerical values and the calculation result;
    battery means housed in at least one further one of said calculator element housing portions for supplying power to the semiconductor integrated circuit means;
    writing means housed in said writing element housing part of said body and held therein in such a manner that said writing means can freely be projected out from one end face of the body; and
    an elongated rectangular metal cover which is demountably mounted on said body for covering said panel surface of said body and for reinforcing said thin body when said cover is mounted on said body, both side edges of said elongated cover being bent inwardly to form U-shaped configurations in cross section which are adapted respectively to slidably engage the opposing elongated side edges of said body so that said cover may be slid along the body in its lengthwise direction for removal therefrom.

2. A portable electronic calculator according to claim 1 wherein said body comprises a rectangular, elongated molded plate of a synthetic resinous material having said conductor element housing portions formed therein, and a metal reinforcement plate mounted on said molded plate on the opposite side thereof from said panel surface, said metal reinforcement plate having elongated side edges which are bent at substantially right angles to the plane of said plate and which extend along and engage the opposing elongated side edges of said molded plate.

3. A portable electronic calculator according to claim 1 wherein there is disposed in said writing element housing part a cylindrical holder which is movable in the lengthwise direction of said body, said cylindrical holder having its center parallel to the direction of movement, an inner end portion of said writing means being inserted into said cylindrical holder and held therein by frictional coupling; and a manually engageable operating piece formed in the outer peripheral wall of said holder, said operating piece projecting out of the body adjacent one of the side edges of said body so that said writing means can be extended out of said body and drawn back into said body by moving the operating piece.

4. A portable electronic calculator according to claim 3 wherein a coiled spring is loosely wound on the writing means in the body to bias said cylindrical holder in a direction opposite to that in which the writing means is extended out of the body; and a retaining part formed in the body for retaining the operating piece at the position where the writing means extends out of the body.

5. A portable electronic calculator according to claim 1 wherein said body has a pair of elongated guide grooves formed respectively in the opposing side edges of said body and extending in the lengthwise direction of said body, the inwardly bent portions of said cover being adapted to slidably engage said pair of guide grooves respectively.

6. A portable electronic calculator according to claim 2 wherein said molded plate has a pair of elongated grooves formed in the opposing side edges of said molded plate and extending in the lengthwise direction thereof, the elongated side edges of said metal reinforcement metal plate being bent inwardly to engage said pair of grooves.

7. A portable electronic calculator according to any one of claims 1 to 4, 5 or 6 wherein a clip is mounted on the outside of the cover at one end of said cover; and a projecting piece extending from the end edge of the cover adjacent the clip, said projecting piece being substantially at right angles to the plane of said cover to abut against the central portion of an end face of the body when the cover has been mounted on the body.

8. A portable electronic calculator according to any one of claims 1 to 4, 5 or 6 including a plate spring fixed to one of the side edges of the body, and a recess formed in one of the elongated edges of the cover adapted to resiliently engage the plate spring when the cover has been mounted on the body thereby to prevent the cover from coming off from the body.

9. A portable electronic calculator according to any one of claims 1 to 4, 5 or 6 wherein the keyboard comprises a rubber sheet having formed therein outwardly extending protrusions corresponding to the keys; a conductive rubber element disposed within each protrusion so that, upon manual depression of the protrusion, a pair of terminals on a printed circuit board disposed opposite the rubber sheet are short-circuited by the conductive rubber element; and a small projection formed integrally with each protrusion on the top thereof for engagement by the finger of a user of the calculator.

10. A portable electronic calculator according to claim 2 including an elongated metal panel which overlies said molded plate on the side thereof opposite to said metal reinforcement plate, said metal panel having formed therein a window for said display means and holes for the keys of said keyboard, said metal panel being retained in place at one end thereof by a pawl formed integrally with one end of said molded plate and being retained at the other end thereof by a screw which engages the molded plate.

* * * * *